United States Patent [19]
Moore et al.

[11] Patent Number: 6,084,769
[45] Date of Patent: Jul. 4, 2000

[54] DOCKING STATION WITH AUXILIARY HEAT DISSIPATION SYSTEM FOR A DOCKED PORTABLE COMPUTER

[75] Inventors: David A. Moore, Tomball; Curtis L. Progl, Magnolia; Mark S. Tracy, Tomball, all of Tex.

[73] Assignee: Compaq Computer Corporation, Houston, Tex.

[21] Appl. No.: 09/191,460

[22] Filed: Nov. 12, 1998

Related U.S. Application Data

[63] Continuation-in-part of application No. 08/914,794, Aug. 20, 1997.

[51] Int. Cl.$^7$ .................................................... G06F 1/20
[52] U.S. Cl. ..................... 361/687; 361/686; 361/700; 174/15.2; 165/104.33; 454/184
[58] Field of Search .................................... 361/686, 687, 361/700; 174/15.2; 165/104.33; 454/184

[56] References Cited

U.S. PATENT DOCUMENTS

| | | | |
|---|---|---|---|
| 5,704,212 | 1/1998 | Erler et al. | 361/687 |
| 5,768,101 | 6/1998 | Cheng | 361/686 |
| 5,959,836 | 9/1999 | Bhatia | 361/687 |

*Primary Examiner*—Leo P. Picard
*Assistant Examiner*—John D. Reed
*Attorney, Agent, or Firm*—Konneker & Smith, P.C.

[57] ABSTRACT

A portable computer docking base has incorporated therein a plug-in cooling system used to provide auxiliary operating heat dissipation for a portable notebook computer moved through a docking path along the base into a docked relationship therewith. The docking base cooling system has a fan-cooled heat sink member disposed within its housing, with a thermal plug structure projecting outwardly from the heat sink into the docking path. As the computer reaches its docked orientation on the base, the thermal plug is received in a socket within a heat sink portion of the computer's internal cooling system. The mated plug and socket portions of the two cooling systems form a thermal link therebetween that permits computer operating heat to be transferred to the docking base heat sink for dissipation therefrom. In one embodiment thereof the thermal plug structure is partially defined by an outwardly projecting evaporating end portion of a thermosyphoning heat pipe. In another embodiment thereof, the outwardly projecting thermal plug structure is integrally formed with the internal docking base heat sink and comprises opposing metal plug sections separated by a resilient material. When the plug structure enters the computer heat sink socket, the plug sections are resiliently forced toward one another to provide a socket clamping force on the received plug structure and increase the socket-to-plug heat transfer efficiency.

21 Claims, 4 Drawing Sheets

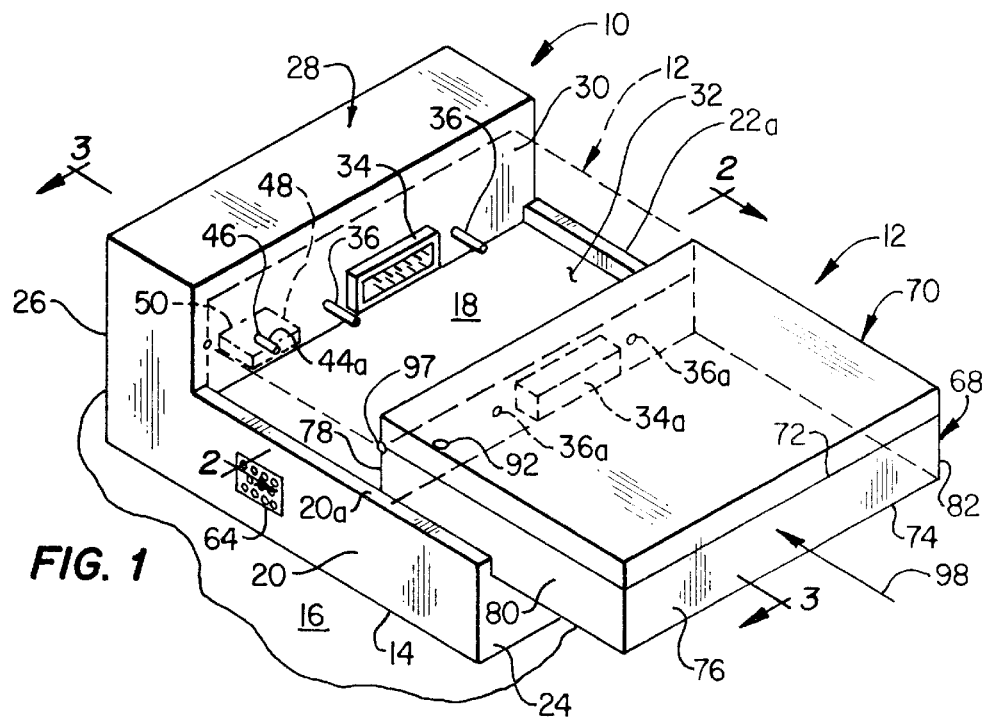
FIG. 1
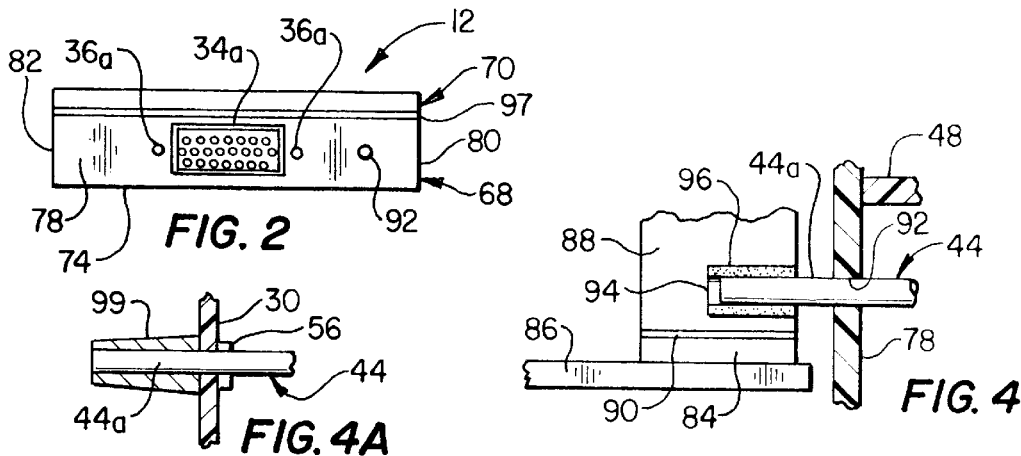
FIG. 2    FIG. 4
FIG. 4A
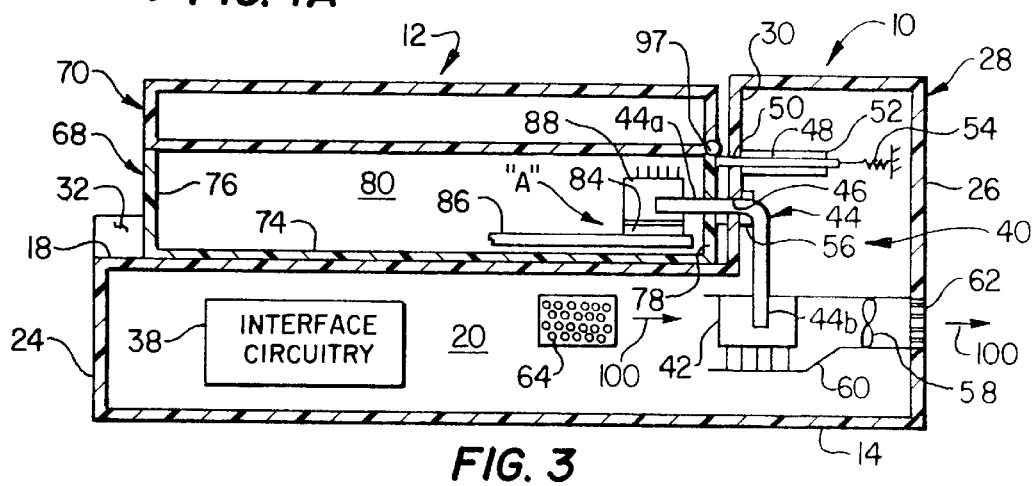
FIG. 3

DOCKING STATION WITH AUXILIARY HEAT DISSIPATION SYSTEM FOR A DOCKED PORTABLE COMPUTER

CROSS-REFERENCE TO RELATED APPLICATION

This application is a continuation-in-part of pending U.S. application Ser. No. 08/917,794 filed on Aug. 20, 1997 and entitled "ELECTRONIC APPARATUS WITH PLUG-IN HEAT PIPE MODULE COOLING SYSTEM", such prior application being hereby incorporated by reference herein in its entirety.

BACKGROUND OF THE INVENTION

1. Field of the Invention

The present invention generally relates to computer apparatus and, in a preferred embodiment thereof, more particularly relates to apparatus for dissipating operating heat from a portable computer operatively connected to a docking station used to electrically connect the docked computer to desktop peripheral devices.

2. Description of Related Art

With the advancement of computer microprocessor technology, portable computers such as the increasingly popular notebook computer are beginning to equal larger desktop computers in performance. The more advanced notebook computers also produce, in quite a small spatial envelope, a very significant amount of operating heat which approaches that generated in a desktop computer and provides the computer designer with the challenging task of sufficiently dissipating the operating heat in order to avoid undesirably high temperatures within the interior of the notebook computer and on its various external surface areas.

Many modern notebook computers are typically operated in three modes—(1) by itself under internal battery power, (2) by itself using converted DC electrical power from an AC electrical source, or (3) operatively connected (or "docked") to a docking station expansion base structure which electrically couples the docked portable computer to desktop peripheral devices such as a monitor, mouse and keyboard.

Typically, in the first two of these operating modes the display screen lid portion of the notebook computer is opened, thereby increasing the total exterior surface area of the computer exposed to ambient air to which computer operating heat may be dissipated. When the notebook computer is coupled to the docking station, however, the computer's display screen lid is typically closed, thereby reducing the overall exposed exterior computer surface area from which heat may be dissipated. This tends to appreciably increase the interior and exterior operating temperatures of the docked computer compared to applications in which it operated by itself with its display screen lid in its opened orientation. Such operating temperature increases are aggravated by the fact that the docking station physically covers and insulates large exterior portions of the docked computer and inhibits the dissipation of heat therefrom.

AS an example, a modern high speed notebook computer microprocessor can generate within the computer on the order of about 8 watts when the computer is in its battery mode, about 10–12 watts when the computer is in its AC mode, and up to about 20 watts when the computer is operatively coupled to a docking station.

Of course, from an operating heat dissipation standpoint, provisions must be made to handle the maximum heat load condition—i.e., when the notebook computer is docked with its lid closed. This has proven to be an extremely challenging design task since the small spatial envelope of modern notebook computer as a practical matter precludes the use therein of traditional desktop computer cooling apparatus such as large internal fans and heat sinks.

A need thus exists for apparatus which will adequately dissipate the substantially increased operating heat generated by a docked portable notebook computer. It is to this need that the present invention is directed.

SUMMARY OF THE INVENTION

In carrying out principles of the present invention, in accordance with a preferred embodiment thereof, a specially designed docking base is utilized to provide auxiliary operating heat dissipation for a portable computer, representatively a notebook computer, operatively docked thereto. This auxiliary heat dissipation provided by the docking base advantageously reduces the amount of computer operating heat dissipation that must be provided for by apparatus carried within the portable computer itself.

The docking base has a housing with a computer receiving area, and the portable computer is movable through the receiving area, along a docking path, to a docked relationship with the docking base. A first heat dissipation system carried by the computer is operative to dissipate a first quantity of operating heat therefrom, and a second heat dissipation system carried by the docking base is operative, when the computer is docked, to supplement the computer cooling provided by the first heat dissipation system.

From a broad perspective, according to a key aspect of the invention, the first and second heat dissipation systems have heat receiving portions which, in response to docking of the portable computer on the docking base, engage one another and form a thermal linking structure that transfers from the first heat dissipation to the second heat dissipation system. Representatively, the heat receiving portions of the first and second heat dissipation systems are configured to engage one another in an interfitted manner in response to docking of the portable computer on the docking base.

Preferably, the heat receiving portion of the second heat dissipation system has a thermal plug portion which projects into the docking path and is receivable in a socket area of the heat receiving portion of the first heat dissipation system in response to docking of the portable computer.

In one embodiment thereof, the thermal plug portion is defined by an evaporating end portion of a thermosyphoning heat pipe which projects outwardly from the docking base housing, in the docking path direction, and is receivable in a thermal interface material-lined socked formed within the heat receiving portion, representatively a metal heat sink member, of the first heat dissipation system in response to docking of the computer. To shield the outwardly projecting heat pipe evaporating end portion, a guard wall is spring-biased to an extended position in which projects outwardly from the docking base housing and overlies the heat pipe evaporating end portion. As the computer is being docked, and the heat pipe evaporating end portion enters the interior of the computer and the heat receiving structure socket within the computer, the computer engages the guard wall and causes it to retract into the docking base housing.

In another embodiment thereof, the thermal plug portion projects into the docking path in a direction transverse to the computer movement direction of the docking path and is defined by a plurality of rigid, heat conductive plug sections separated by a resilient material and being resiliently deflectable toward one another. The thermal plug portion and its related interior computer socket are relatively configured in a manner such that the plug portion is clampingly received in its associated socket area, in response to docking of the portable computer, to improve the thermal efficiency of the interface between the mated plug and socket structures.

BRIEF DESCRIPTION OF THE DRAWINGS

FIG. 1 is a simplified, somewhat schematic perspective view of a representative portable notebook computer being operatively coupled to a docking station expansion base;

FIG. 2 is a rear side elevational view of the notebook computer taken along line 2—2 of FIG. 1;

FIG. 3 is an enlarged scale schematic cross-sectional view through the expansion base and the notebook computer operatively docked thereto, taken along line -3 of FIG. 1 and illustrating a unique docked computer cooling system incorporated in the expansion base and embodying principles of the present invention;

FIG. 4 is an enlarged scale detail view of the area "A" in FIG. 3;

FIG. 4A is an enlarged scale cross-sectional view through an alternate, reinforced heat pipe evaporating end portion of the cooling system;

DETAILED DESCRIPTION

Figure 5A:
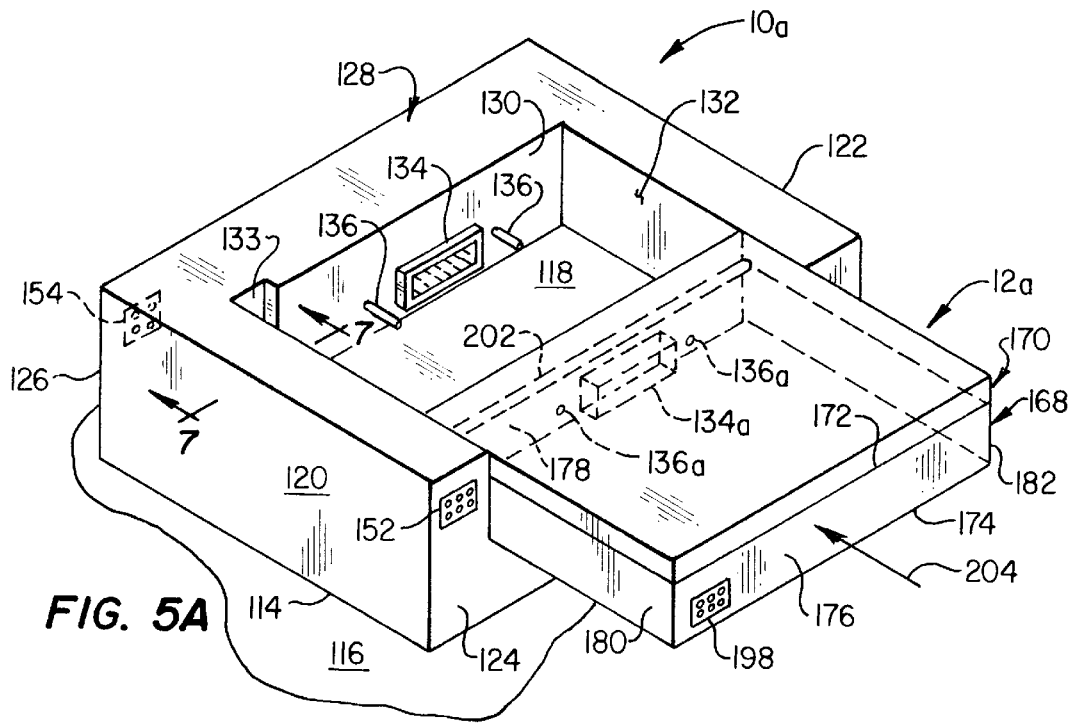
FIGS. 5A and 5B are simplified, somewhat schematic perspective view of alternate embodiments of the expansion base and the notebook computer, with FIG. 5A illustrating the computer in an undocked position, and FIG. 5B illustrating the computer in a docked orientation on the expansion or docking base.

Perspectively illustrated in simplified, somewhat schematic form in FIG. 1 is a specially designed docking station expansion base 10 that embodies principles of the present invention and is used to operatively couple a representative portable notebook computer 12 to selected desktop peripheral devices (not shown) such as a monitor, mouse and keyboard.

The expansion base 10 has a generally rectangularly configured housing with a horizontal bottom side wall 14 adapted to rest on a horizontal support surface such as a desktop 16, a horizontal top side wall 18, left and right vertical side walls 20 and 22, and front and rear end walls 24 and 26. Expansion base 10 also has an upwardly projecting rear housing end portion 28 which includes the rear end wall 26 and has a vertical front wall 30 forwardly spaced apart therefrom. Upper side edge portions 20a, 22a of the housing side walls 20,22 project upwardly beyond the top side wall 18 and form therewith a recessed computer docking receiving area 32 that horizontally extends, along a docking path, between the vertical housing walls 24 and 30.

Centrally disposed on the front wall 30 of the upwardly projecting rear housing end portion 28 is a forwardly projecting, horizontally elongated electrical connector 34 positioned between two forwardly projecting guide pins 36. Connector 34 is operatively coupled to interface circuitry 38 located within the expansion base 10 (see FIG. 3). Interface circuitry 38 functions in a conventional manner to operatively couple the connector 34 (and thus the computer 12 when it is docked to the expansion base 10 as later described herein) to selected desktop peripheral devices (not shown) such as a monitor, a mouse and a keyboard.

According to a key aspect of the present invention, a specially designed plug-in computer cooling system 40 (see FIG. 3) is disposed within the interior of the expansion base 10 and is used, as later described herein, to provide auxiliary operating heat dissipation for the computer 12 when it is operatively docked to the expansion base 10.

The auxiliary computer cooling system 40 schematically depicted in FIG. 3 includes a heat receiving portion defined by a body section in the form of a finned metal heat sink member 42 disposed within the interior of the docking base housing, and a plug section representatively in the form of a thermosyphoning heat pipe 44 having an evaporating end portion 44a and a condensing end portion 44b. The evaporating end portion 44a projects forwardly through the docking base housing wall 30, through a suitable opening 46 therein to the left of the connector 34 (see FIG. 1), into the docking path for the computer 12, and the condensing end 44b of the heat pipe 44 is closely received in an opening within the heat sink 42 so as to be in a heat transfer relationship with the heat sink 42.

A horizontally disposed guard wall 48 is positioned above the forwardly projecting heat pipe evaporating end portion 44a, extends through an opening 50 in the housing wall 30 above the heat pipe end portion 44a, and has opposite side edges supportingly and slidingly received in suitable track structures 52 extending horizontally inwardly from the housing wall 30 into the interior of the docking base housing. A schematically depicted spring structure 54 within the housing interior forwardly bears against the rear end of the guard wall 48 and biases the guard wall 48 to its dotted line FIG. 1 position, in which the wall 48 overlies and shields the forwardly projecting heat pipe evaporating end portion 44a. However, as later described herein, when the notebook computer 12 is docked it engages and rearwardly forces the wall 48, against the forward resilient biasing force of the spring 54, into the interior of the docking base housing as shown in FIG. 3. Heat pipe section 44a is supported at the wall opening 46 by a suitable bracing structure 56.

The auxiliary plug-in computer cooling system 40 also includes, as schematically depicted in FIG. 3, a cooling fan 58 enclosed within a shroud or duct 60 which is coupled between the finned heat sink 42 and a perforated air outlet opening area 62 formed in the rear housing wall 26, and a perforated air inlet opening area 64 formed in the left housing side wall 20.

Referring now to FIGS. 1–4, the notebook computer 12 has generally rectangular base and display screen lid housings 68 and 70. Base housing 68 has top and bottom side walls 72 and 74, front and rear side walls 76 and 78, and left and right end walls 80 and 82. Disposed within the base housing 68 is a heat generating electronic component, representatively a microprocessor 84, which is mounted on the top side of a horizontally oriented circuit board 86 inwardly adjacent the rear base housing wall 78. The top side of the microprocessor 84 is secured to the bottom side of a heat receiving member in the form of a finned metal heat sink structure 88, in thermal communication therewith, by a suitable thermal interface material 90.

A small circular hole 92, sized to slidably receive the forwardly projecting evaporating end portion 44a of the heat pipe 44, is formed in the rear side wall 78 of the base housing 68, as best shown in FIGS. 1, 2 and 4, and coaxially faces a horizontally extending circular opening 94 formed in the rear side of the heat sink 88 (see FIG. 4). The opening 94 is lined with a hollow tubular section 96 of a resilient thermal interface material such as, for example, the elastomeric/silicon oxide material manufactured by the Bergquist Company of Minneapolis, Minn. under the tradename "Gap Pad VO Soft". The tubular interface material section 96 is sized to closely but releasably receive the outer end of the heat pipe evaporating section 44a, as later described herein, to place the evaporating section 44a in efficient thermal communication with the heat sink 88. Other suitable types of thermal interface materials may be used in place of the interface material 96 if desired.

As schematically illustrated in partial cross-section in FIG. 4A, the heat pipe end portion 44a projecting outwardly from housing wall 30 can be suitably reinforced by, for example, surrounding it with a tapered cylindrical metal heat slug member 99 appropriately anchored to wall 30. To accommodate this modification, the lined socket opening 94 would be correspondingly tapered.

Turning now to FIG. 1, a recessed electrical connector 34a, which is releasably mateable with the expansion base connector 34, is centrally located on the rear side wall 78 of the base housing 68 between two circular holes 36a formed in the wall 78 and configured to releasably receive the guide pins 36 as the computer 12 is being docked as later described herein. The rectangular display screen lid housing 70 of the portable notebook computer 12 is secured by a hinge structure 97 to a top rear side edge portion of the base housing 68 for pivotal movement relative to the base housing 68 between a closed position (shown in FIGS. 1–3) in which the lid housing 70 extends across and covers the top side 72 of the base housing 68, and an open position (not shown) in which the lid housing 70 is pivoted away from top base housing side 72 to a generally vertical stand-alone use orientation. A suitable latch mechanism (not shown) is provided for releasably holding the display screen lid housing 70 in its closed orientation.

With the notebook computer 12 in its illustrated closed orientation, the computer is docked to the expansion base 10 by placing the computer 12 in the recessed receiving area 32 with the lid housing 70 facing upwardly and the rear side wall 78 of the base housing 68 facing the front wall 30 of the expansion base rear housing end portion 28. When the computer 12 is placed in the receiving area 32 in this manner, the bottom wall 74 of the base housing 68 contacts the top side wall 18 of the expansion base 10 in a manner vertically aligning the computer connector 34a, guide pin openings 36a and base housing circular rear side opening 92 respectively with the expansion base electrical connector 34, guide pins 36 and the exposed, forwardly projecting evaporating end portion 44a of the thermosyphoning heat pipe 44. Additionally, the left and right end walls 80,82 of the computer base housing 68 slidingly engage the upwardly projecting expansion base guide portions 20a, 22a in a manner horizontally aligning the computer connector 34a, guide pin openings 36a and base housing rear side opening 92 respectively with the expansion base electrical connector 34, guide pins 36 and the exposed, forwardly projecting evaporating end portion 44a of the heat pipe 44.

Next, as indicated by the arrow 98 in FIG. 1, the computer 12 is moved rearwardly through the docking path toward the vertical expansion base wall 30—either manually or by a suitable motorized drive system appropriately incorporated into the expansion base 10—to the computer's docked orientation shown in FIG. 3 and in dotted lines in FIG. 1. As the rear side of the computer 12 approaches the vertical expansion base wall 30, the guide pins 36 enter the rear computer wall openings 36a, the connectors 34,34a are releasably mated to couple the internal computer electronics to the desktop peripheral devices (not shown) via the interface circuitry 38, the guard wall 48 is pushed back to its retracted position (see FIG. 3), and the exposed, forwardly projecting heat pipe end portion 44a passes inwardly through the rear side base housing opening 92 and is snugly received within the tubular thermal interface material member 96 lining the opening 94 within the heat sink member 88 in the computer base housing 68.

With the computer 12 docked as schematically illustrated in FIG. 3, operating heat from the computer processor 84 (or other heat-generating electronic component to which the heat sink structure 88 could be connected) is quite efficiently transferred from the internal computer heat sink 88, through the thermosyphoning heat pipe 44 to the docking base internal heat sink 42, and then dissipated from the docking base heat sink 42 by operation of the fan 58 which sequentially flows ambient cooling air 100 inwardly through the air inlet opening area 64, through the duct 60 and across the heat sink 42, and then outwardly through the expansion base air outlet opening area 62. As can be seen, the heat pipe end portion 44a defines a thermal plug which, when received in the socket portion 90 within the computer heat sink 88, creates with the socket portion a thermal linking structure that provides a heat transfer path between heat receiving sections of the computer and docking base heat dissipation systems.

The computer operating heat dissipation provided by the specially designed expansion base cooling system 40 augments the cooling system disposed within the interior of the computer 12, which may include the heat sink structure 88 and other components not illustrated herein. Importantly, the reduced computer surface available for cooling resulting from docking the computer 12 with its display screen lid housing 70 closed and major portions of its exterior surface area blocked by portions of the expansion base 10 is compensated for without increasing the interior computer space that must be dedicated to heat dissipation apparatus. Thus, the heat dissipation system within the notebook computer 12 need only be sized to handle the substantially lesser operating heat generated by the computer 12 in its undocked battery and AC power modes.

Figure 5B:
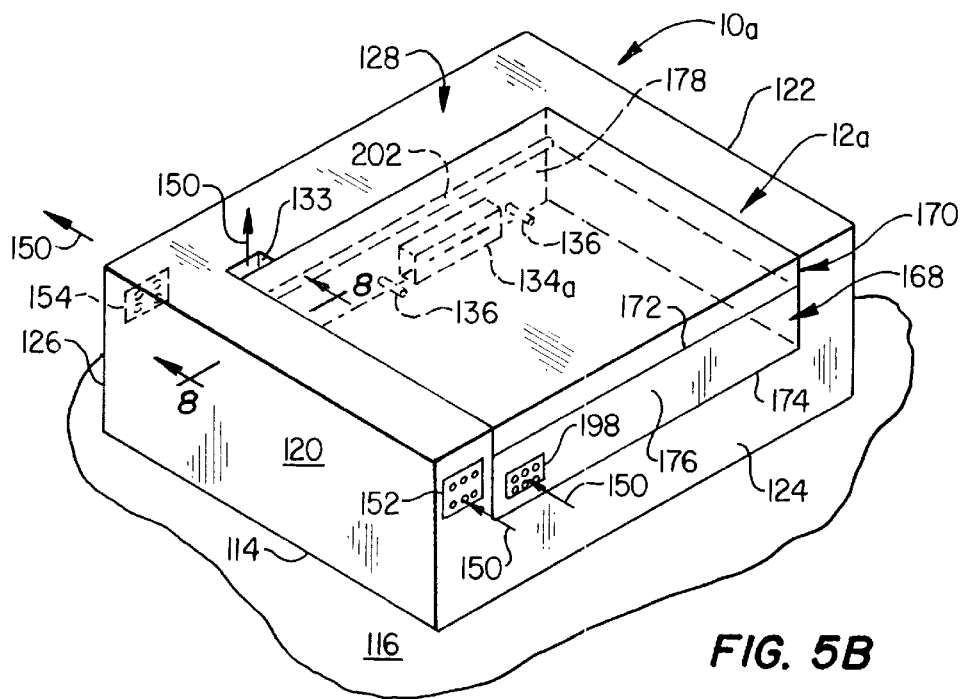

Alternate embodiments 10a and 12a of the previously described docking base 10 and notebook computer 12 are perspectively illustrated in simplified, somewhat schematic form in FIGS. 5A and 5B, with the computer 12a being undocked in FIG. 5A and docked in FIG. 5B. Like the previously described docking base 10, the docking base 10a is used to operatively couple the portable computer 12a to selected desktop peripheral devices (not shown) such as a monitor, mouse and keyboard, and has a subsequently described plug-in heat dissipation system which desirably augments the operating heat dissipation system of the docked computer 12a.

Expansion base 10a has a generally rectangularly configured housing with a horizontal bottom side wall 114 adapted to rest on a horizontal support surface such as a desktop 116, a horizontal top side wall 118, left and right hollow vertical side wall structures 120 and 122, and front and rear end walls 124 and 126. The expansion base 10a also has an upwardly projecting rear housing end portion 128 which includes the rear end wall 126 and has a vertical front wall 130 forwardly spaced apart therefrom. Hollow side wall structures 120 and 122 project upwardly beyond the top side wall 118 and form therewith a recessed computer docking receiving area 132 that horizontally extends along a computer docking path between the vertical housing walls 124 and 130. For purposes later described herein, a rearwardly inset area 133 is formed in the vertical wall 130 at the left rear corner of the receiving area 132. The inset area vertically extends from the top side wall 118 to the top side of the rear housing end portion 128.

Centrally disposed on the front wall 130 of the upwardly projecting rear housing end portion 128 is a forwardly projecting, horizontally elongated electrical connector 134 positioned between two forwardly projecting guide pins 136. Connector 134 is operatively coupled to interface circuitry 138 located within the interior of the expansion base 10a (see FIG. 7). Interface circuitry 138 functions in a conventional manner to operatively couple the connector 134 (and thus the computer 12a when it is docked to the expansion or docking base 10a as later described herein) to selected desktop peripheral devices (not shown) such as a monitor, a mouse and a keyboard.

According to a key aspect of the present invention, a specially designed plug-in computer cooling system 140 (see FIGS. 6–8) is disposed within the interior of the expansion base 10a and is used, as later described herein, to provide auxiliary operating heat dissipation for the computer 12a when it is operatively docked to the expansion base 10a.

Figure 6:
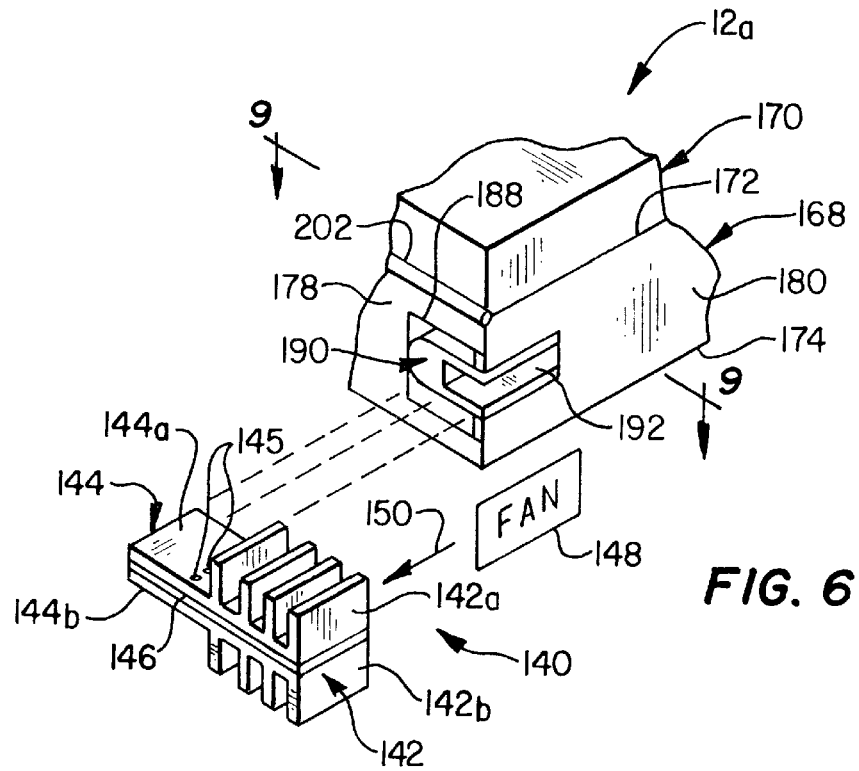
FIG. 6 is an enlarged scale simplified perspective view of a left rear corner portion of the FIG. alternate computer embodiment and a heat receiving portion of the alternate docking base auxiliary computer heat dissipation system embodiment.
Figure 7:
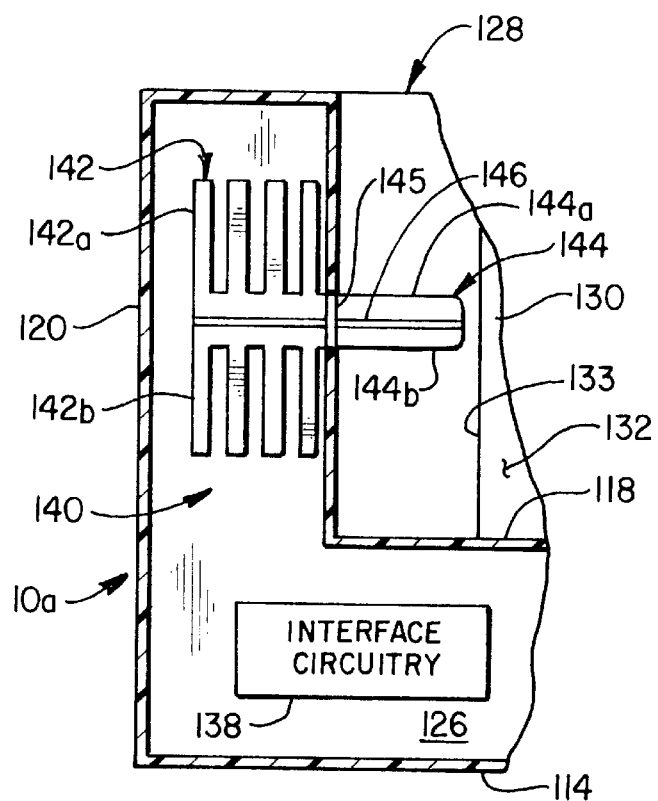
FIG. 7 is an enlarged scale cross-sectional view through a portion of the alternate docking base embodiment taken along line 7—7 of FIG. 5A.
Figure 8:
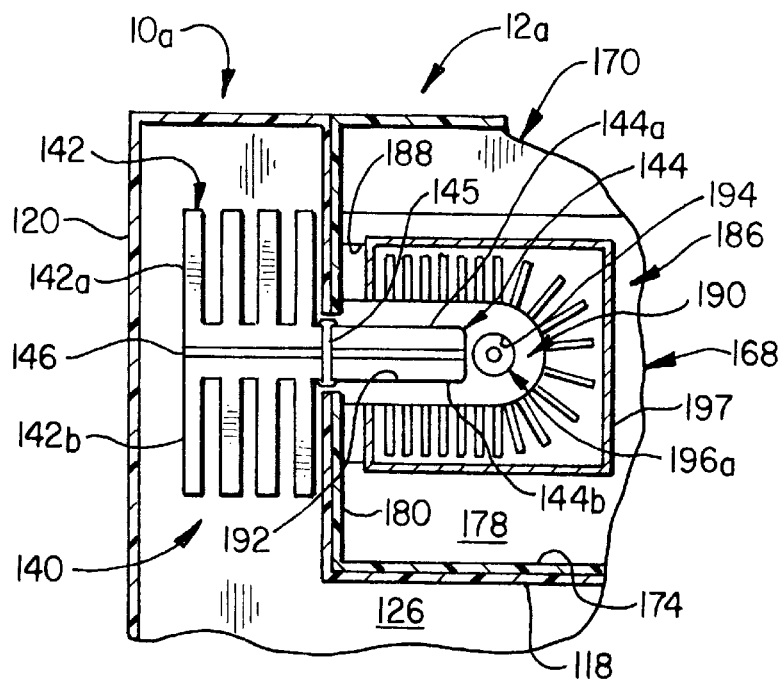
FIG. 8 is an enlarged scale cross-sectional view through a portion of the alternate docking base and computer embodiments taken along line 8—8 of FIG. 5B.
Figure 9:
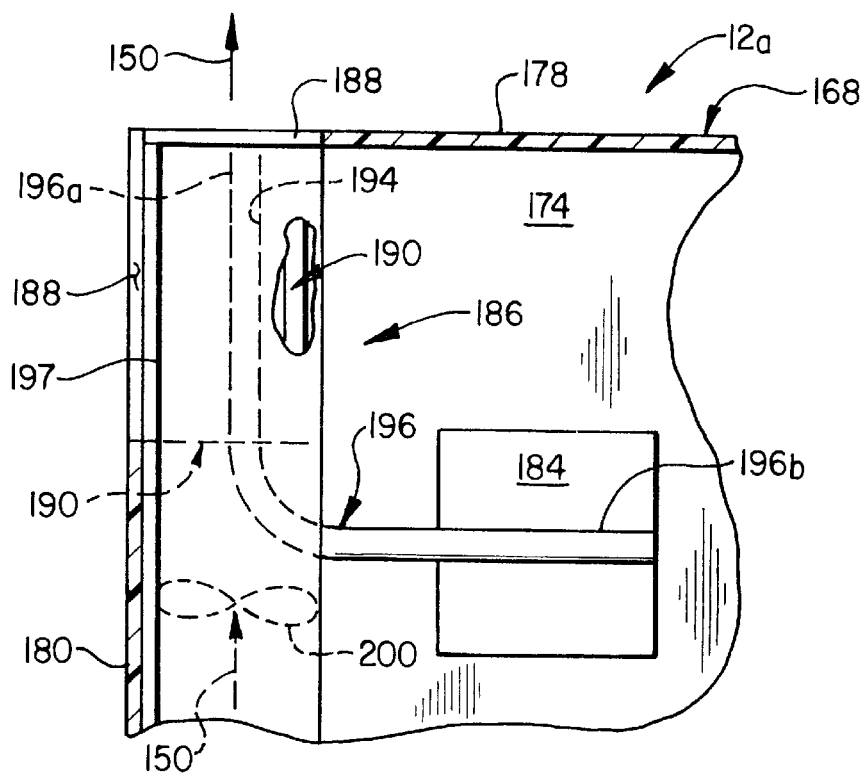
FIG. 9 is an enlarged scale cross-sectional view through a portion of the alternate computer embodiment taken along line 9—9 of FIG. 6.

The auxiliary computer cooling system 140 schematically depicted in FIGS. 6–8 includes a heat receiving portion defined by a body section in the form of a finned metal heat sink section 142 disposed within the interior of the left hollow side wall structure 122, and a plug section 144 which is formed integrally with the heat sink portion 142 and projects outwardly through the right side of the wall structure 120 into the receiving area 132 (see FIG. 7). Illustratively, the integral heat sink and plug sections 142, 144 are formed in top and bottom halves 142a,144a and 142b,144b which are joined by fasteners 145 and separated by a layer of suitable resilient material 146 which permits the plug halves 144a,144b to be resiliently deflected toward one another as later described herein. AS illustrated, the outer ends of the plug halves 144a,144b are slightly rounded.

The auxiliary plug-in computer cooling system 140 also includes a schematically depicted fan 148 (see FIG. 6) disposed in the interior of the hollow side wall structure 120. Operation of the fan 148 draws ambient cooling air 150 inwardly through a perforated inlet air opening area 152 disposed on the front side of the hollow side wall structure 120 (see FIG. 5B), flows the air 150 over the heat sink section 142, and then discharges the air 150 outwardly through a perforated outlet air opening area 154 on the rear side of the hollow side wall structure 122.

Referring now to FIGS. 5A, 6, 8 and 9, the notebook computer 12a has generally rectangular base and display screen lid housings 168 and 170. Base housing 168 has top and bottom side walls 172 and 174, front and rear side walls 176 and 178, and left and right end walls 180 and 182. Disposed within the base housing 168 is a heat generating electronic component, representatively a microprocessor 184 (see FIG. 9). Operating heat generated by the microprocessor 184 is dissipated from the computer 12a by means of a heat dissipation system 186 disposed within the base housing 168.

The computer's internal heat dissipation system 186 includes an opening 188 formed in a left rear corner portion of the base housing 168 (see FIGS. 6, 8 and 9) and extending horizontally along the rear wall 178 and right end wall 180 of the base housing 168, and a generally U-shaped finned metal heat sink 190 disposed in the base housing 168 inwardly of the opening 188. Heat sink 190 has a socket slot 192 extending between its front and rear ends and opening outwardly through its left side, the socket 192 being exposed at the corner base housing opening 188 as perspectively illustrated in FIG. 6.

Socket 192 is configured to clampingly receive the plug 144 in response to docking of the notebook computer 12a as subsequently described herein. To facilitate this clamping of the plug 144, the top side surface of the socket 192 (see FIG. 6) is provided with a slight forward and downward slope, and the bottom side surface of the socket 192 is provided with a slight forward and upward slope. Accordingly, as the notebook computer 12a is being rearwardly docked, the sloped top and bottom side surfaces of the socket 192 force the upper and lower plug halves 144a,144b toward one another, thereby compressing the resilient material 146 therebetween, as the plug section 144 enters the socket 192. Alternatively, the top and/or bottom side surfaces of the plug section 144 could be sloped to achieve this clamping of the plug section 144 within the socket 192.

A body portion of the finned heat sink 190 inwardly adjacent the socket 192 has a circular opening 194 formed therein. Opening 194 receives a condensing end portion 196a of a thermosyphoning heat pipe 196 having an evaporating end portion 196b in heat-receiving thermal contact with the microprocessor 184. The computer's internal heat dissipation system 186 also includes a shroud or duct 197 which extends around the upper, lower and right sides of the finned heat sink 190 (see FIG. 8) and communicates the base housing opening 188 with an air inlet opening area 198 formed in the front base housing side wall 176 (see FIGS. 5A and 5B). A cooling fan 200 (see FIG. 9) is operatively disposed in the duct 197 upstream from the finned heat sink 190.

Turning now to FIG. 5A, a recessed electrical connector 134a, which is releasably mateable with the expansion base connector 134, is centrally located on the rear side wall 178 of the base housing 168 between two circular holes 136a formed in the wall 178 and configured to releasably receive the guide pins 136 as the computer 12a is being docked as later described herein. The rectangular display screen lid housing 170 of the portable notebook computer 12a is secured by a hinge structure 202 to a top rear side edge portion of the base housing 168 for pivotal movement relative to the base housing 168 between a closed position (shown in FIGS. 5A–8) in which the lid housing 170 extends across and covers the top side 172 of the base housing 168, and an open position (not shown) in which the lid housing 170 is pivoted away from top base housing side 172 to a generally vertical stand-alone use orientation. A suitable latch mechanism (not shown) is provided for releasably holding the display screen lid housing 170 in its closed orientation.

With the notebook computer 12a in its illustrated closed orientation, the computer is docked to the expansion base 10a by placing the computer 12a in the recessed receiving area 132 with the lid housing 170 facing upwardly and the rear side wall 178 of the base housing 168 facing the front wall 130 of the expansion base rear housing end portion 128. When the computer 12a is placed in the receiving area 132 in this manner, the bottom wall 174 of the base housing 168 contacts the top side wall 118 of the expansion base 10a in a manner vertically aligning the computer connector 134a, guide pin openings 136a and the computer heat sink socket 192 respectively with the expansion base electrical connector 134, guide pins 136 and the exposed, rightwardly projecting thermal plug structure 144. Additionally, the left and right end walls of the closed computer 12a slidingly engage the expansion base hollow side wall structures 120,122 in a manner horizontally aligning the computer connector 134a, guide pin openings 136a and the computer heat sink socket 192 respectively with the expansion base electrical connector 134, guide pins 136 and the exposed, rightwardly projecting thermal plug structure 144.

Next, as indicated by the arrow 204 in FIG. 5A, the computer 12a is moved rearwardly along the docking path toward the vertical expansion base wall 130—either manually or by a suitable motorized drive system appropriately incorporated into the expansion base 10a—to the computer's docked orientation shown in FIGS. 5B and 8. AS the rear side of the computer 12a approaches the vertical expansion base wall 130, the guide pins 136 enter the rear computer wall openings 136a, the connectors 134,134a are releasably mated to couple the internal computer electronics to the desktop peripheral devices (not shown) via the interface circuitry 138, and the plug structure 144 automatically enters and is resiliently clamped within the socket area 192. The plug section 144 and the socket area 192 that receives it thus form a thermal linking structure that thermally communicates the heat receiving portions (i.e., the heat sinks 142 and 190) of the docking base and computer heat dissipation systems 140 and 186.

With the computer 12a docked as schematically illustrated in FIGS. 5B and 8, operating heat from the computer processor 184 (or other heat-generating electronic components to which the heat sink structure 190 could be connected) is transferred through the thermosyphoning heat pipe 196 to the computer's internal heat sink 190, and then transferred to the docking base's internal heat sink structure 142 via the socket-received thermal plug structure 144. Operating heat received by the docking base heat sink 142 is dissipated therefrom by operation of the docking base fan 148 which sequentially flows ambient cooling air 150 inwardly through the air inlet opening area 152, across the heat sink 142 and then outwardly through the expansion base air outlet opening area 154. At the same time, operation of the internal computer cooling fan 200 sequentially flows ambient cooling air 150 inwardly through the computer's air inlet opening area 198, through the duct 197 and across the computer's internal heat sink 190, and then outwardly through the base housing opening 188. Ambient cooling air discharged from the rear base housing corner opening 188 enters the expansion base housing recess 133 and is then upwardly discharged from its open top end (see FIG. 5B).

The computer operating heat dissipation provided by the specially designed expansion base cooling system 140 advantageously augments the operating heat dissipation provided by the cooling system 186 disposed within the interior of the notebook computer 12a. Importantly, as previously mentioned herein, the reduced computer surface area available for cooling resulting from docking the computer 12a with its display screen lid housing 170 closed and major portions of its exterior surface area blocked by portions of the expansion base 10a is compensated for without increasing the interior computer space that must be dedicated to heat dissipation apparatus. Thus, the heat dissipation system 186 within the notebook computer 12a need only be sized to handle the substantially lesser operating heat generated by the computer 12a in its undocked battery and AC power modes.

The foregoing detailed description is to be clearly understood as being given by way of illustration and example only, the spirit and scope of the present invention being limited solely by the appended claims.

What is claimed is:

1. Computer apparatus comprising:

a docking base having a housing with a computer receiving area;

a portable computer movable through said computer receiving area, along a docking path, to a docked relationship with said docking base;

a first heat dissipation system carried by said portable computer and operative to dissipate a first quantity of operating heat therefrom; and a second heat dissipation system carried by said docking base and operative, when said portable computer is docked, to supplement the computer cooling provided by said first heat dissipation system, said first and second heat dissipation systems having heat receiving portions which, in response to docking of said portable computer on said docking base, engage one another and form a thermal linking structure that transfers heat from said first heat dissipation system to said second heat dissipation system, said heat receiving portions of said first and second heat dissipation systems being configured to engage one another in an interfitted manner in response to docking of said portable computer on said docking base, one of said heat receiving portions including an end portion of a thermosyphoning heat pipe, and the other of said heat receiving portions including a socket structure adapted to matingly receive said end portion of said thermosyphoning heat pipe.

2. Computer apparatus comprising:

a docking base having a housing with a computer receiving area;

a portable computer movable through said computer receiving area, along a docking path, to a docked relationship with said docking base;

a first heat dissipation system carried by said portable computer and operative to dissipate a first quantity of operating heat therefrom; and a second heat dissipation system carried by said docking base and operative, when said portable computer is docked, to supplement the computer cooling provided by said first heat dissipation system, said first and second heat dissipation systems having heat receiving portions which, in response to docking of said portable computer on said docking base, engage one another and form a thermal linking structure that transfers heat from said first heat dissipation system to said second heat dissipation system, said heat receiving portions of said first and second heat dissipation system being configured to engage one another in an interfitted manner in response to docking of said portable computer on said docking base, said heat receiving portion of said first heat dissipation system having a socket portion, and said heat receiving portion of said second heat dissipation system having a plug portion which projects into said docking path and is receivable in said socket portion in response to docking of said portable computer on said docking base, said heat receiving portion of said second heat dissipation system including a thermosyphoning heat pipe and said plug portion including an evaporating portion of said thermosyphoning heat pipe.

3. The computer apparatus of claim 2 wherein said heat receiving portion of said first heat dissipation system is a heat sink structure in which said socket portion is formed.

4. The computer apparatus of claim 3 wherein said socket portion is lined with a resiliently deformable thermal interface material.

5. The computer apparatus of claim 2 further comprising:
a guard wall structure carried by said docking base housing for movement relative thereto between an extended position in which said guard wall structure at least partially shields said evaporating end portion of said thermosyphoning heat pipe, and a retracted position in which said guard wall structure is moved away from said extended position, said guard wall structure being engageable by said portable computer and moved thereby from said extended position to said retracted position, in response to docking said portable computer on said docking base, said guard wall structure being yieldingly biased toward said extended position.

6. Computer apparatus comprising:
a docking base having a housing with a computer receiving area;
a portable computer movable through said computer receiving area, along a docking path, to a docked relationship with said docking base;
a first heat dissipation system carried by said portable computer and operative to dissipate a first quantity of operating heat therefrom; and
a second heat dissipation system carried by said docking base and operative, when said portable computer is docked, to supplement the computer cooling provided by said first heat dissipation system,
said first and second heat dissipation systems having heat receiving portions which, in response to docking of said portable computer on said docking base, engage one another and form a thermal linking structure that transfers heat from said first heat dissipation system to said second heat dissipation system,
said heat receiving portions of said first and second heat dissipation system being configured to engage one another in an interfitted manner in response to docking of said portable computer on said docking base,
said heat receiving portion of said first heat dissipation system having a socket portion, and said heat receiving portion of said second heat dissipation system having a plug portion which projects into said docking path and is receivable in said socket portion in response to docking of said portable computer on said docking base,
said plug portion and said socket portion being relatively configured in a manner such that said plug portion is clampingly receivable in said socket portion.

7. The computer apparatus of claim 6 wherein said socket portion has a tape red configuration adapted, upon receipt therein of said plug portion, to deflect said rigid sections of said plug portion toward one another.

8. The computer apparatus of claim 6 wherein said heat receiving portion of said first heat dissipation system is a heat sink structure in which said socket portion is formed.

9. The computer apparatus of claim 2 wherein:
said portable computer is movable in a first direction through said docking path, and
said plug portion projects into said docking path in said first direction.

10. Computer apparatus comprising:
a docking base having a housing with a computer receiving area;
a portable computer movable through said computer receiving area, along a docking path, to a docked relationship with said docking base;
a first heat dissipation system carried by said portable computer and operative to dissipate a first quantity of operating heat therefrom; and
a second heat dissipation system carried by said docking base and operative, when said portable computer is docked, to supplement the computer cooling provided by said first heat dissipation system,
said first and second heat dissipation systems having heat receiving portions which, in response to docking of said portable computer on said docking base, engage one another and form a thermal linking structure that transfers heat from said first heat dissipation system to said second heat dissipation system,
said heat receiving portions of said first and second heat dissipation system being configured to engage one another in an interfitted manner in response to docking of said portable computer on said docking base,
said heat receiving portion of said first heat dissipation system having a socket portion, and said heat receiving portion of said second heat dissipation system having a plug portion which projects into said docking path and is receivable in said socket portion in response to docking of said portable computer on said docking base,
said portable computer being movable in a first direction through said docking path, and
said plug portion projecting into said docking path in a second direction transverse to said first direction.

11. The computer apparatus of claim 1 wherein said portable computer is a notebook computer.

12. The computer apparatus of claim 1 wherein:
said portable computer has an exterior wall which, when said portable computer is docked on said docking base, faces and is closely adjacent a wall of said docking base housing, said exterior wall of said portable computer having an air outlet opening area therein,
said first heat dissipation system includes a cooling fan operative to flow air outwardly through said air outlet opening area, and
said wall of said docking base housing having an inset area aligned with said air outlet opening area and defining an air discharge passage extending externally along said wall of said docking base housing.

13. For use with a portable computer having an internal heat dissipation system with a heat receiving portion, a docking base to which the portable computer may be docked, said docking base comprising:
a housing having a computer receiving area and a docking path through which the portable computer may be moved into a docked relationship with said housing; and a docking base heat dissipation system operative, when the portable computer is docked, to supplement the computer cooling provided by the computer's internal heat dissipation system, said docking base heat dissipation system including a heat receiving structure having a body portion disposed within said housing, and an external connector portion projecting into said docking path and configured to be brought into heat receiving contact with the heat receiving portion of the portable computer in response to a docking movement of the portable computer through said docking path, said external connector portion being configured to be engaged in an interfitted relationship with the heat receiving portion of the internal heat dissipation system of the portable computer, said external connector portion being a thermal plug structure adapted to be received in a socket portion of the heat receiving portion of the internal heat dissipation system of the portable computer, said thermal plug structure including an evaporating end portion of a thermosyphoning heat pipe.

14. The docking base of claim 13 wherein:

said docking path extends in a first direction, and said external connector portion projects into said docking path in said first direction.

15. For use with a portable computer having an internal heat dissipation system with a heat receiving portion, a docking base to which the portable computer may be docked, said docking base comprising:

a housing having a computer receiving area and a docking path through which the portable computer may be moved into a docked relationship with said housing; and a docking base heat dissipation system operative, when the portable computer is docked, to supplement the computer cooling provided by the computer's internal heat dissipation system, said docking base heat dissipation system including a heat receiving structure having a body portion disposed within said housing, and an external connector portion projecting into said docking path and configured to be brought into heat receiving contact with the heat receiving portion of the portable computer in response to a docking movement of the portable computer through said docking path, said docking path extending in a first direction, and said external connector portion projecting into said docking path in a second direction transverse to said first direction.

16. The docking base of claim 13 further comprising a guard wall structure carried by said housing and being yieldingly biased toward an extended position in which it extends outwardly from said housing and at least partially shields said evaporating end portion, said guard wall being engageable and retractable by the portable computer in response to docking thereof on said housing.

17. For use with a portable computer having an internal heat dissipation system with a heat receiving portion, a docking base to which the portable computer may be docked, said docking base comprising:

a housing having a computer receiving area and a docking path through which the portable computer may be moved into a docked relationship with said housing; and a docking base heat dissipation system operative, when the portable computer is docked, to supplement the computer cooling provided by the computer's internal heat dissipation system, said docking base heat dissipation system including a heat receiving structure having a body portion disposed within said housing, and an external connector portion projecting into said docking path and configured to be brought into heat receiving contact with the heat receiving portion of the portable computer in response to a docking movement of the portable computer through said docking path, said external connector portion being configured to be engaged in an interfitted relationship with the heat receiving portion of the internal heat dissipation system of the portable computer, said external connector portion being a thermal plug structure adapted to be received in a socket portion of the heat receiving portion of the internal heat dissipation system of the portable computer, said thermal plug structure including a plurality of rigid plug sections separated by a resilient material and being resiliently deflectable toward one another.

18. The docking base of claim 13 wherein said housing has an outer wall facing said computer receiving area and having an indentation defining an external, channel operative to receive cooling air discharged from the docked portable computer.

19. A method of utilizing a portable computer docking base to provide auxiliary operating heat dissipation for a portable computer operatively docked thereon and having an internal heat-generating component, said docking base having a docking path through which said portable computer may be moved to a docked orientation, said method comprising the steps of:

associating a heat dissipation system with said docking base housing, said heat dissipation system having a first heat receiving structure having a body portion disposed within said docking base housing, and an external connector portion projecting into said docking path;

securing a second heat receiving structure to said portable computer in thermal communication with said internal heat-generating component; and docking said portable computer on said docking base housing in a manner responsively bringing said external connector portion into heat transfer contact with said second heat receiving structure to thereby transfer at least a portion of the operating heat generated by the docked portable computer to said body portion of said first heat receiving structure, said docking step being performed in a manner bringing said external connector portion into an interfitted relationship with said second heat receiving structure, said second heat receiving structure having a socket area disposed therein, and said docking step being performed in a manner removably plugging said external connector portion into said socket area, and said associating step being performed utilizing an evaporating end portion of a thermosyphoning heat pipe to define at least a portion of said external connector portion.

20. The method of claim 19 wherein said associating step is performed utilizing, to define said external connector portion, a plug structure having a plurality of rigid plug sections separated by a resilient material and being resiliently deflectable toward one another.

21. A method of utilizing a portable computer docking base to provide auxiliary operating heat dissipation for a portable computer operatively docked thereon and having an internal heat-generating component, said docking base having a docking path through which said portable computer may be moved to a docked orientation, said method comprising the steps of:

associating a heat dissipation system with said docking base housing, said heat dissipation system having a first heat receiving structure having a body portion disposed within said docking base housing, and an external connector portion projecting into said docking path;

securing a second heat receiving structure to said portable computer in thermal communication with said internal heat-generating component, one of said heat receiving structures including a thermosyphoning heat pipe end portion, and the other of said heat receiving structures including a socket; and docking said portable computer on said docking base housing in a manner plugging said heat pipe end portion into said socket.

* * * * *